United States Patent [19]
House et al.

[11] Patent Number: 6,145,119
[45] Date of Patent: Nov. 7, 2000

[54] PROGRAMMING DEVELOPMENT ENVIRONMENT FOR INTRANET AND INTERNET APPLICATIONS EMPLOYING UNIQUE PROJECT DATA STRUCTURE

[75] Inventors: Daniel Edward House; Brian Joseph Owings, both of San Jose; Shiau-Shiau Pei, Saratoga, all of Calif.

[73] Assignee: International Business Machines Corporation, Armonk, N.Y.

[21] Appl. No.: 08/828,854

[22] Filed: Mar. 31, 1997

[51] Int. Cl.[7] .................................................. G06F 9/45
[52] U.S. Cl. ........................ 717/1; 707/103; 707/100; 717/2
[58] Field of Search ...................... 395/701, 702, 395/703; 707/10, 100, 102, 103, 104, 200, 513, 901

[56] References Cited

U.S. PATENT DOCUMENTS

| | | | |
|---|---|---|---|
| 5,168,441 | 12/1992 | Onarheim et al. | 364/146 |
| 5,179,698 | 1/1993 | Bachman et al. | 707/4 |
| 5,193,182 | 3/1993 | Bachman et al. | 707/100 |
| 5,193,183 | 3/1993 | Bachman | 707/1 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |
| 5,706,502 | 1/1998 | Foley et al. | 707/10 |
| 5,737,599 | 4/1998 | Rowe et al. | 707/104 |
| 5,752,244 | 5/1998 | Rose et al. | 707/5 |
| 5,754,782 | 5/1998 | Masada | 395/200.43 |
| 5,761,499 | 6/1998 | Sonderegger | 707/10 |
| 5,787,431 | 7/1998 | Shaughnessy | 707/100 |
| 5,787,437 | 7/1998 | Potterveld et al. | 707/103 |
| 5,842,020 | 11/1998 | Faustini | 395/701 |
| 5,850,548 | 12/1998 | Williams | 395/701 |
| 5,857,197 | 1/1999 | Mullins | 707/103 |
| 5,966,702 | 10/1999 | Fresko et al. | 707/1 |

OTHER PUBLICATIONS

Peterson, "The Evolution of Intelligent Engines", Business Comm. Review, Nov. 1996, pp. 38–41.

G. Shankar, "Web application development environment", Infoworld, Mar. 1997, pp. 3–5.

Kim et al., "Multimedia Service Object Modeling", Proc. of Object–Oriented Real–time Dependable Systems, IEEE, Feb. 1997, pp. 347–354.

Joosen et al., "On Flexible Support for Mobile Objects", Proceedings of the IWOOS '96, IEEE, 1996, pp. 3–7.

*Primary Examiner*—Kakali Chaki
*Attorney, Agent, or Firm*—Gates & Cooper

[57] ABSTRACT

A method, apparatus, and article of manufacture for providing a programming development environment that supports the development of Internet and Intranet applications. The present invention describes a data structure readable by the computer for encapsulating a software project with a project application defined by executable programming logic, and a project environment for developing the application. The data structure comprises a first section comprising the executable programming logic, and all data needed to load and execute the project application on the computer, and a second section for storing other data, including data required to restore the project environment.

18 Claims, 6 Drawing Sheets

PROGRAMMING DEVELOPMENT ENVIRONMENT FOR INTRANET AND INTERNET APPLICATIONS EMPLOYING UNIQUE PROJECT DATA STRUCTURE

CROSS-REFERENCE TO RELATED APPLICATIONS

This application is related to the following co-pending and commonly-assigned patent applications:

application Ser. No. 08/828,476, entitled "SHARED OBJECT MODEL," filed on same date herewith, by Brian J. Owings, Shiau-Shiau Pei, and Daniel E. House, now U.S. Pat. No. 5,890,158;

application Ser. No. 08/828,480, entitled "REMOTE SCRIPTING OF LOCAL OBJECTS," filed on same date herewith, by Daniel E. House, Constance J. Nelin, and Rebecca B. Nin;

application Ser. No. 08/828,989, entitled "METHOD AND APPARATUS FOR SIMULATING A MULTI-TIERED COMPUTER ENVIRONMENT," filed on same date herewith, by Daniel E. House and Constance J. Nelin, now U.S. Pat. No. 5,940,593;

application Ser. No. 08/828,478, entitled "MULTI-TIER VIEW PROJECT WINDOW," filed on same date herewith, by Howard J. Glaser, Daniel E. House, and Constance J. Nelin, now U.S. Pat. No. 5,953,525;

application Ser. No. 08/829,104, entitled "EXTENDER USER INTERFACE," filed on same date herewith, by Thomas E. Conrad, Howard J. Glaser, Jean C. Ho, James L. Keesey, Constance J. Nelin, and Gerold J. Wilmot;

application Ser. No. 08/828,846, entitled "SHARED MODULES GRAPHICAL USER INTERFACE," filed on same date herewith, by Howard J. Glaser, Daniel E. House, and Constance J. Nelin, now U.S. Pat. No. 5,956,036;

application Ser. No. 08/828,479, entitled "QUERY SELECTION FOR A PROGRAM DEVELOPMENT ENVIRONMENT," filed on same date herewith, by Howard J. Glaser and Mary C. Lehner, now U.S. Pat. No. 5,911,075;

application Ser. No. 08/828,477, entitled "DOCKING AND FLOATING MENU/TOOL BAR," filed on same date herewith, by Howard J. Glaser, Stewart E. Nickolas, and Karl D. Johnson, now U.S. Pat. No. 5,883,626;

application Ser. No. 08/828,890, entitled "HTML INTEGRATION UTILITY FOR A PROGRAM DEVELOPMENT ENVIRONMENT," filed on same date herewith, by Howard J. Glaser, now U.S. Pat. No. 5,953,731;

application Ser. No. 08/828,897, entitled "EXTENDER SMART GUIDE," filed on same date herewith, by Howard J. Glaser;

application Ser. No. 08/828,481, entitled "MULTI-TIER DEBUGGING," filed on same date herewith, by Daniel E. House and Constance J. Nelin; and application Ser. No. 08/828,990, entitled "DYNAMIC DISCOVERY OF CONTROLS," filed on same date herewith, by Daniel E. House and Constance J. Nelin, now U.S. Pat. No. 5,875,322;

all of which applications are incorporated by reference herein.

BACKGROUND OF THE INVENTION

1. Field of the Invention

This invention relates in general to programming development environments performed by computers, and in particular, to the use of a unique data structure in a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American National Standards Organization (ANSI) and the International Standards Organization (ISO).

Thus, there is a need in the art for methods of accessing RDBMS software across an Internet or Intranet, and especially via Web-based networks. Further, there is a need for simplified development environments for such systems. For example, current development environments have separate, fragmented, non-associated files for each aspect of the project. These separate files must be pulled together from separate sources to build the project.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications.

The present invention provides a data structure for storing all aspects of a project. The data structure allows all elements and associations necessary to build the components of the project, such as the source, objects, executables to be contained or described in a single file. This makes group development easier, makes file sharing possible, and provides other benefits as well.

The present invention describes a data structure readable by the computer for encapsulating a software project with a project application defined by executable programming logic, and a project environment for developing the application. The data structure comprises a first section comprising the executable programming logic, and all data needed to load and execute the project application on the computer, and a second section for storing other data, including data required to restore the project environment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
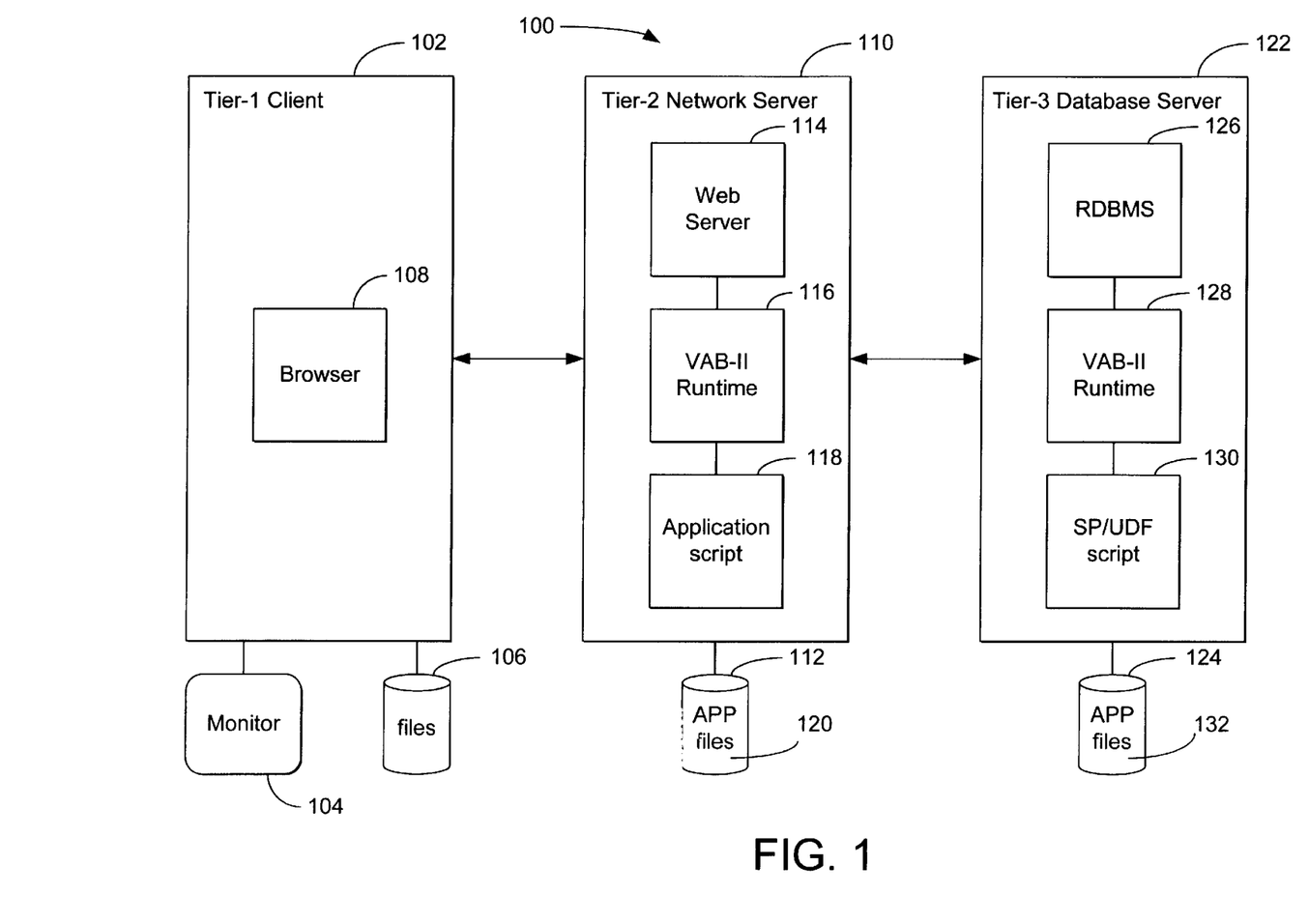
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
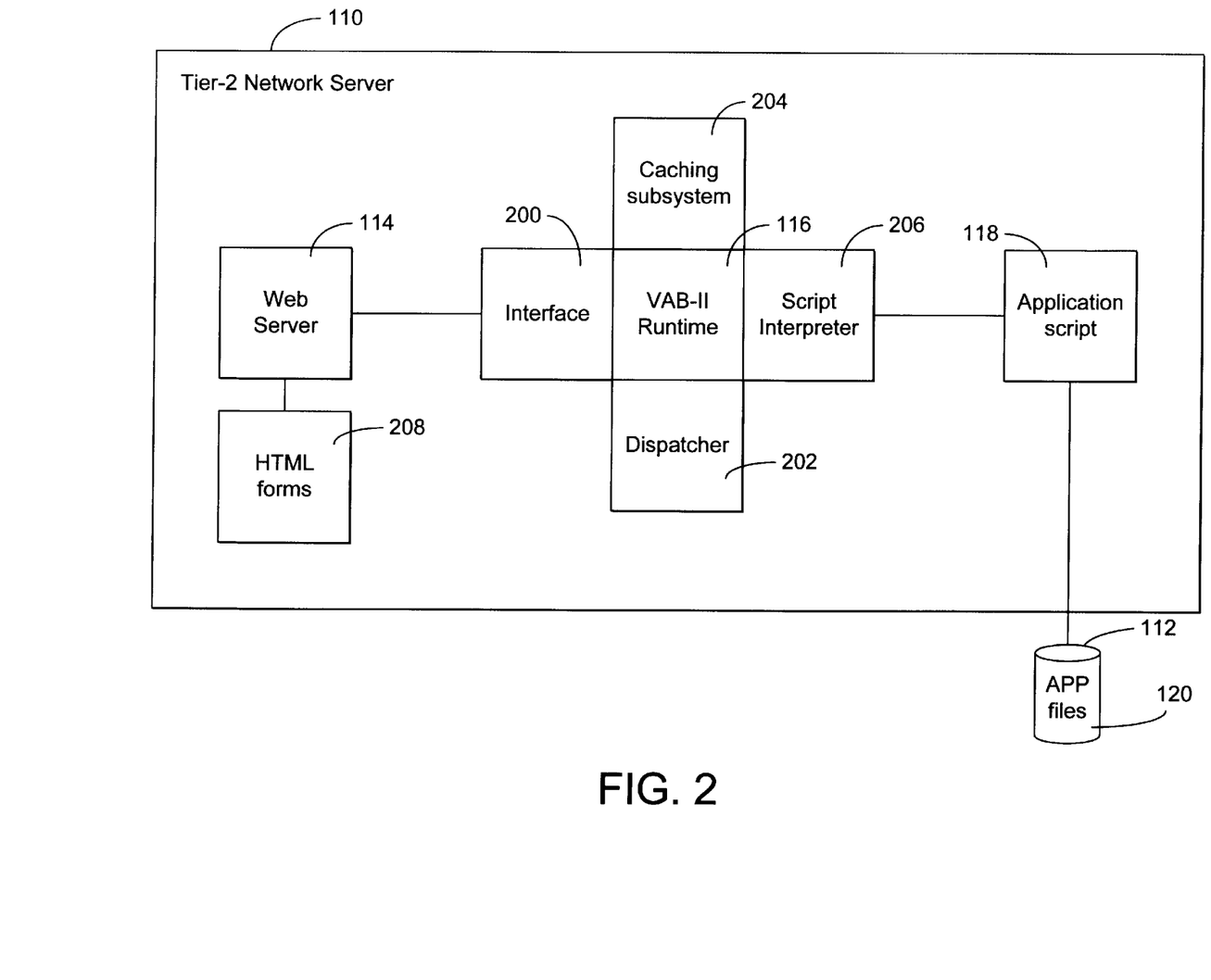
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
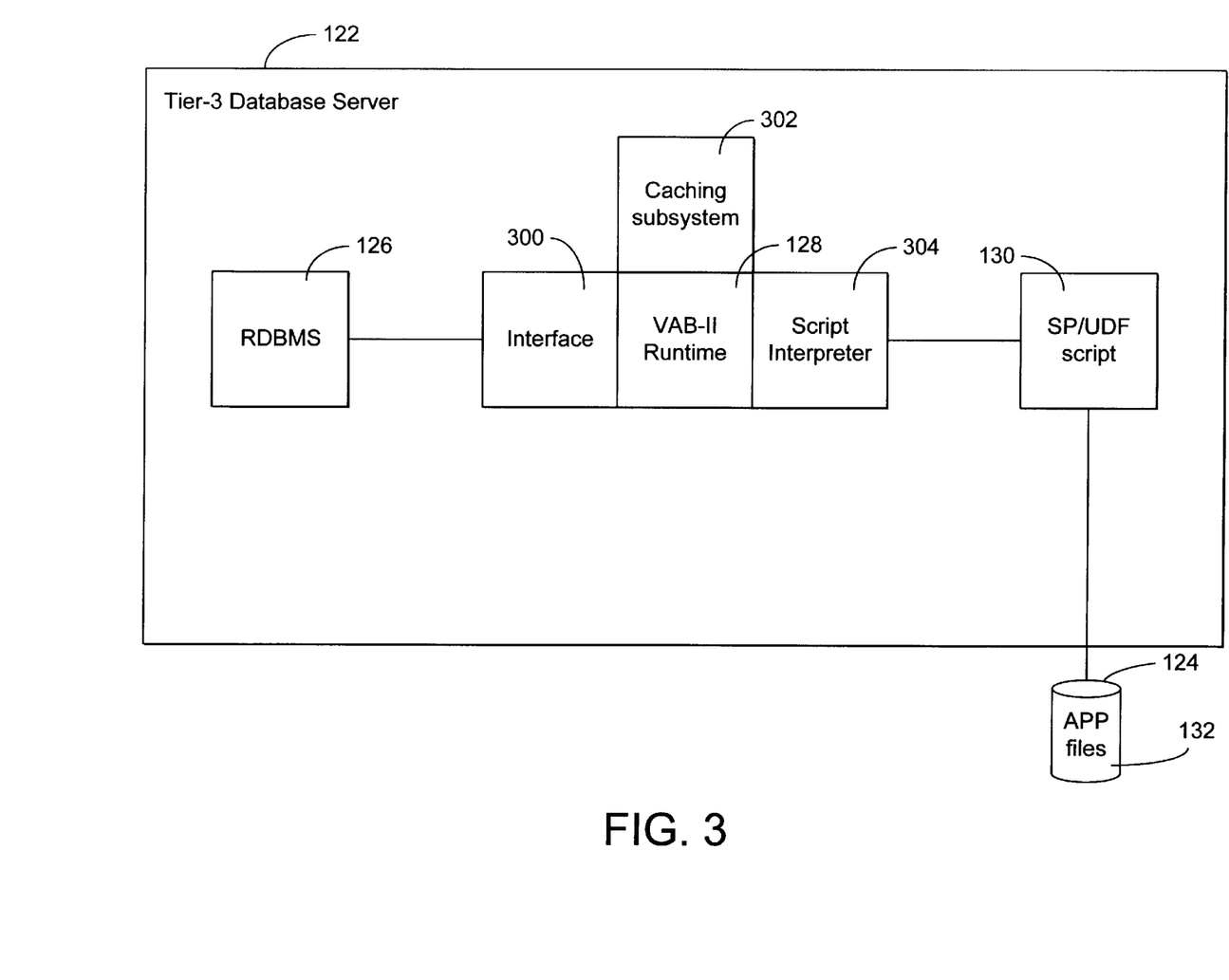
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 stored on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
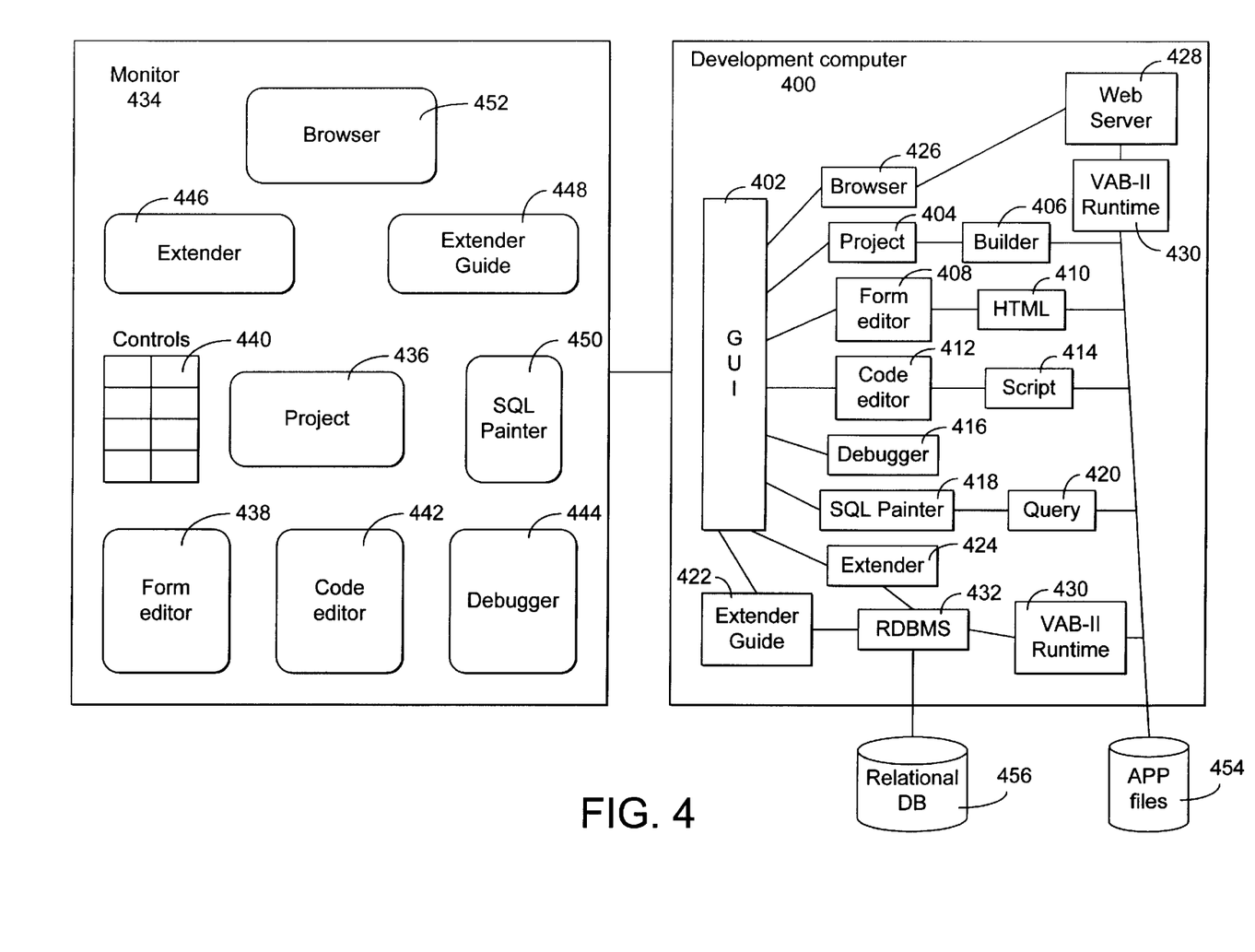
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

APP File

Figure 5A:
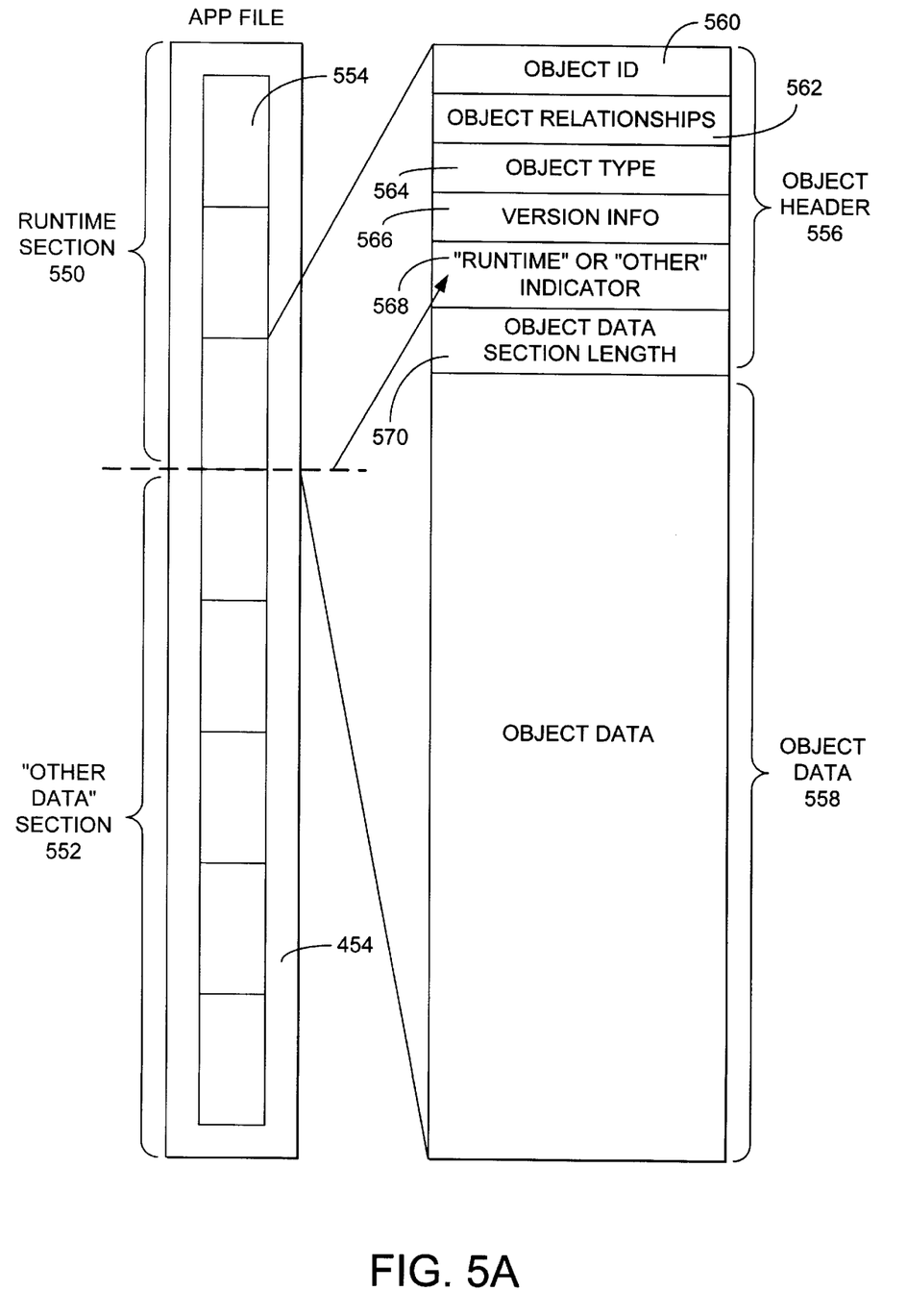
FIGS. 5A and 5B are illustrations of the data structure of the APP file of the present invention, and the method steps used in connection with the data structure.

FIG. 5A is a block diagram that illustrates an APP file constructed by the development environment according to the present invention.

The APP file 454 contains all of the data and structures that represent a software project in the present invention including: project-related data such as information on the application for the tier-2 network server 110, stored procedures (SPs) or user-defined functions (UDFs) for the tier-3 database server 122, source code (optionally), event logic controls, forms, and relationships among all of these things.

The APP file 454 encapsulates all of the objects that make up a project. From a single APP file 454, the project and all of its state can be recovered (state also includes such design time behavior as which form is currently active and where in a module the code editor was last positioned before the project was saved). The APP file 454 also enables the present invention to utilize a common mechanism for restoring a project across development machines, across executables, and across releases.

The APP file 454 describes the persistence mechanism for the Object Model that all components of the present invention are built upon. Although not humanly readable, the data structure of the APP file 454 is described as follows.

The APP file 454 comprises two major sections, a Runtime Section 550 and an Other Data section 552. The Runtime Section 550 contains all of the data needed primarily at "runtime," including executable programming logic. Data stored in the Runtime Section 550 is used to quickly and efficiently load information that is used to run an application. The second major section is The Other Data Section 552, which contains all other project related data, including project environment data (such as source code, design time properties, other project development data, etc.). By segmenting the APP file 454 into these two sections, the speed of execution is enhanced, because reading in the Other Data Section 552 can be skipped when executing an application.

Each of the major sections is further segmented into a series of minor sections 554 (a variable number of them), with each minor section containing information about one object in the VAB-II Object Model. For example, one minor section 554 may represent the OMProject object, another minor section could represent a particular Form object within it, etc.

Since the Object Model used in the present invention is a tree structure, the APP file 454 must represent this information. A node in a tree can have "n" children and "m" siblings (internally, a sibling relationship may be represented as a singly linked list, in which case a node would appear to have at most one sibling).

When in memory, relationships such as child or sibling can be represented simply by a memory pointer to an object. However, when encapsulated inside a APP file 454, pointers to memory have no meaning. The present invention solves this problem by instead representing information describing relationships between objects inside the APP file 454 using Object IDs 560 and Object Relationships 562.

Each object in the Object Model has an Object ID 560. Instead of using memory pointers, the APP file 454 uses these Object IDs 560 to store relationships between the objects. That is, instead of saving memory pointers in the APP file 454, the relationship is stored. For example, although not stored or interpreted in the English form below, the relationship may comprise the following: "ObjectID-5 has-child ObjectID-19."

For every object in the Runtime Section 550 or the Other Data Section 552, there is an Object Header 556 and Object Data 558. The Object Header 556 comprises the following types of information: ObjectID 560, relationships 562, such as Has-Child(ObjectID) and Has-Sibling(ObjectID), Object Type 564 (e.g., Form), VersionInformation 566, Runtime-OrOther indicator 568 used to determine where the Runtime Section stops and the Other Data Section begins, and length of the Object Data Section 570.

The Object Data Section 558 contains a stream of information that has meaning only to the particular Object Type. For example, an Object Type of Form will have in its Object Data Section 558 properties of the Form object (such as size, color, etc.). For speed and efficiency, these data are in "stream" format. That is, it is written in an order that is determined by the Object and read back in the exact same order (as opposed to writing name-value pairs that could be read and written in any order, but at the expense of extra space and time to parse the information when reading).

As an example of streaming, suppose that an object has property Color=Red and Size=15. The Object data section would have "red 15" in it. It is up to the Object Type object to know that it wrote the order Color then Size and must read it back in the same way. An alternative would have been to write "Color=Red, Size=15" into the Object Data. This alternative would: (1) take up more space, and (2) require that the data be parsed when read it (that is, when reading a APP file and reconstructing the Object, the data could be read in the reverse order (size then color), because a name-value pair was saved). While more flexible, there is a high performance penalty to be paid for this when large numbers of properties are involved.

From the foregoing, it can be seen that the data structure and use of the APP file 454 has numerous advantages. First, the APP file 454 uses a hybrid format in that it is partly name-value based (the Object Header Section) and partly stream based (the Object Data Section). This allows for flexibility, very high speed, and low space or storage capacity requirements. In addition, because the data structure of the APP file 454 segments the information into a Runtime Section 550 and an Other Data Section 552, it allows for even higher speed when the APP file 454 is being read for the purpose of executing an application (as opposed to reading an APP file 454 to continue developing the application).

Another advantage of the data structure of the APP file 454 is that the APP file 454 contains all data required for a project. Other development tools typically keep many files that represent a project, resulting in the disadvantages discussed herein. Still another advantage of the APP file 454 is that it contains a persistent representation of the Object Model, which allows for a common code base among many parts of the present invention (such as Builder, Runtime, Control Pad, and others).

Figure 5B:
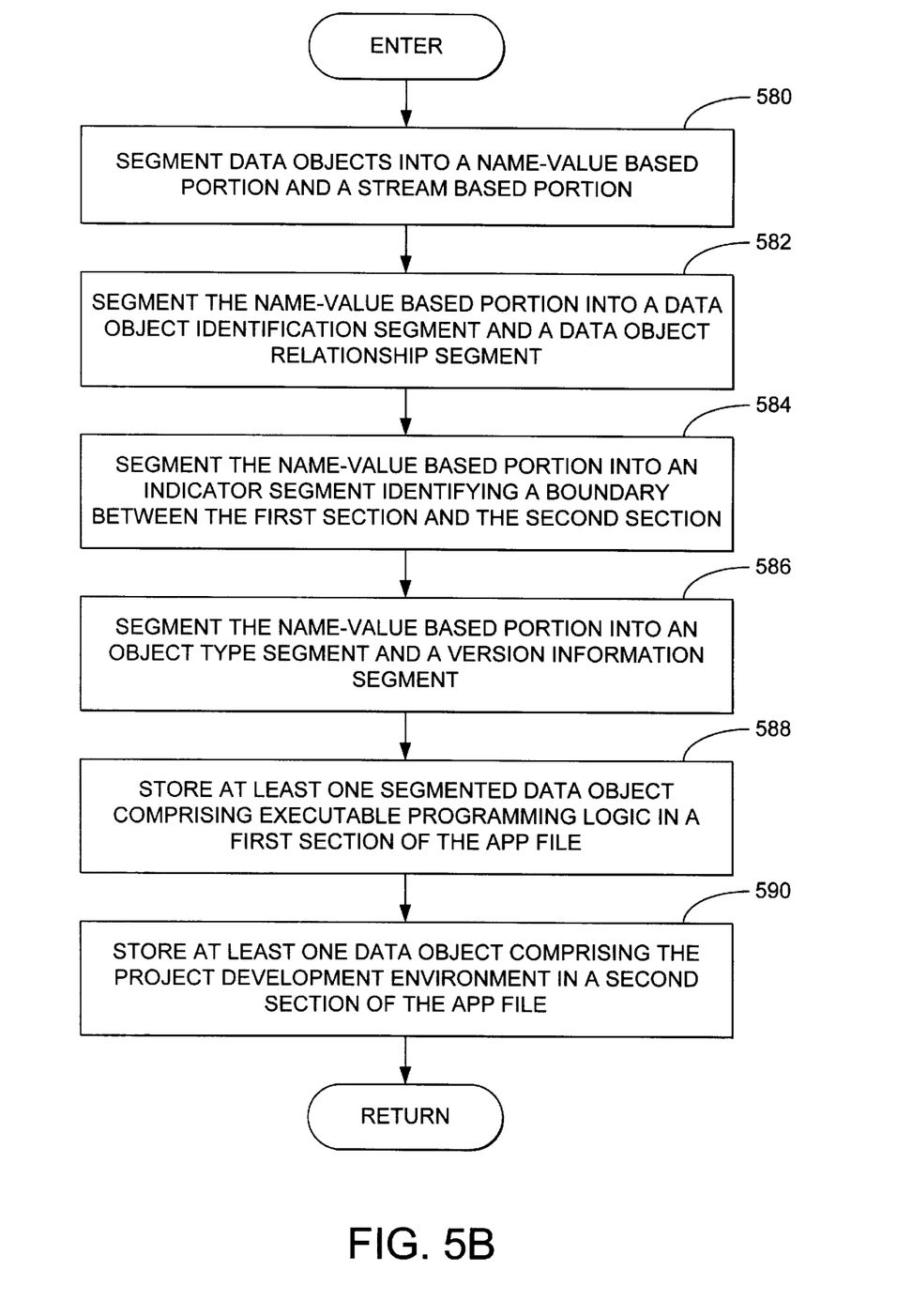

FIG. 5B is a flow chart illustrating the method steps used in storing data in the APP file 454 in accordance with the present invention. First, as shown in block 580, the data objects are segmented into name-value based portions and stream-based portions (for example, the object header 556 and the object data 558, respectively). Then, the name-value based portion is segmented into a data object identification segment, and a data object relationship segment. This is illustrated in Block 582. Block 584 illustrates the method step of segmenting the name-value based portion into an indicator segment identifying a boundary between the Runtime Section 550 and the Other Data 552 Section of the APP file 454. As shown in block 586, the method further includes the optional step of segmenting the object header into segments indicating the object type and version information. Finally, the data objects comprising executable programming logic is stored in the first, or Runtime Section 550 of the APP file 454, while the remaining data, including data describing the project development environment or state is stored in the Other Data Section 552. This is shown in blocks 588 and 590, respectively.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications.

The present invention describes a data structure readable by the computer for encapsulating a software project with a project application defined by executable programming logic, and a project environment for developing the application. The data structure comprises a first section comprising the executable programming logic, and all data needed to load and execute the project application on the computer, and a second section for storing other data, including data required to restore the project environment.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data structure stored in a computer-readable medium for representing a software project in a single file, the software project comprising a project application defined by executable programming logic, and a project environment for developing the application, the data structure comprising:

a first section comprising the executable programming logic for loading and executing the project application in the computer;

a second section for storing data for restoring the project environment;

wherein the first and second sections each comprise a plurality of interrelated data objects accessible by the application, the data objects having a name-value based portion and an associated stream-based portion, and wherein the name-value based portion comprises a data object identification segment for uniquely identifying the data object; and a data object relationship segment for specifying the relationship between the data object and other data objects.

2. The data structure of claim 1, wherein the data objects are interrelated in a node tree and the data object relationship segment specifies a sibling and a child relationship between the data object and other data objects in the node tree.

3. The data structure of claim 1, wherein the name-value based portion further comprises an indicator segment identifying a boundary between the first section and the second section.

4. The data structure of claim 1, wherein the name-value based portion further comprises:
   an object type segment; and
   a version information segment.

5. A computer-implemented method of storing and restoring data representing a software project in comprehensive data structure readable by a computer, the software project comprising a project application operable with a plurality of data objects, and a project development environment, the method comprising:
   storing at least one data object comprising the executable programming logic needed to load and execute the application in a first section of a data structure;
   storing at least one data object comprising the project development environment in a second section of the data structure;
   segmenting the data objects into a name-value based portion and an associated stream-based portion; and
   segmenting the name-value based portion into a data object identification segment for identifying the data object and a data object relationship segment for specifying the relationship between the data object and other data objects.

6. The method of claim 5, wherein the data objects are interrelated in a node tree and the data relationship specifies a sibling and a child relationship between the data object and the node tree.

7. The method of claim 5, further comprising the step of segmenting the name-value based portion into an indicator segment identifying a boundary between the first section and the second section.

8. The method of claim 5, further comprising the step of segmenting the name-value based portion into an object type segment and a version information segment.

9. A program storage device, readable by computer, having a processor and a memory, tangibly embodying one or more programs of instructions executable by the computer to perform the method steps of storing and restoring data representing a software project in a comprehensive data structure readable by the computer, the software project operable with a plurality of data objects and comprising a project application, a project development environment and a plurality of data objects, the method comprising the steps of:
   storing at least one data object comprising the executable programming logic needed to load and execute the application in a first section of the data structure; and
   storing at least one data object comprising the project development environment in a second section of the data structure;
   segmenting the data objects into a name-value based portion and an associated stream-based portion; and
   segmenting the name-value based portion into a data object identification segment for identifying the data object and a data object relational segment for specifying the relationship between the data object and other data objects.

10. The program storage device of claim 9, wherein the data objects are interrelated in a node tree and the data relationship specifies a sibling and a child relationship between the data object and the node tree.

11. The program storage device of claim 9, wherein the method further comprises the step of segmenting the name-value based portion into an indicator segment identifying a boundary between the first section and the second section.

12. The program storage device of claim 9, wherein the method further comprises the step of segmenting the name-value based portion into an object type segment and a version information segment.

13. A data structure stored in a computer-readable medium for representing a software project in a single file, the software project comprising a project application defined by executable programming logic, and a project environment for developing the application, the data structure comprising:
   a first section comprising the executable programming logic for loading and executing the project application in the computer; and
   a second section for storing data for restoring the project environment;
   wherein the first and second sections each comprise a plurality of interrelated data objects accessible by the application, the data objects having a name-value based portion and a stream-based portion, the name value portion comprising an indicator segment identifying a boundary between the first and the second section.

14. A data structure stored in a computer-readable medium for representing a software project in a single file, the software project comprising a project application defined by executable programming logic, and a project environment for developing the application, the data structure comprising:
   a first section comprising the executable programming logic for loading and executing the project application in the computer; and
   a second section for storing data for restoring the project environment;
   wherein the first and second sections each comprise a plurality of interrelated data objects accessible by the application, the data objects having a name-value based portion and a stream-based portion, and the name-value based portion further comprises an object-type segment and a version information segment.

15. A computer-implemented method of storing and restoring data representing a software project in a comprehensive data structure readable by a computer, the software project comprising a project application operable with a plurality of data objects, and a project development environment, the method comprising:
   storing at least one data object comprising the executable programming logic needed to load and execute the application in a first section of a data structure;
   storing at least one data object comprising the project development environment in a second section of the data structure;
   segmenting the data objects into a name-value based portion and an associated stream-based portion; and
   segmenting the name-value based portion into an indicator segment identifying a boundary between the first section and the second section.

16. A computer-implemented method of storing and restoring data representing a software project in a comprehensive data structure readable by a computer, the software project comprising a project application operable with a plurality of data objects, and a project development environment, the method comprising:
   storing at least one data object comprising the executable programming logic needed to load and execute the application in a first section of a data structure;
   storing at least one data object comprising the project development environment in a second section of the data structure;

segmenting the data objects into a name-value based portion and an associated stream-based portion; and segmenting the name-value portion into an object-type segment and a version information segment.

17. A program storage device, readable by computer, having a processor and a memory, tangibly embodying one or more programs of instructions executable by the computer to perform the method steps of storing and restoring data representing a software project in a comprehensive data structure readable by the computer, the software project operable with a plurality of data objects and comprising a project application, a project development environment and a plurality of data objects, the method comprising the steps of:

storing at least one data object comprising the executable programming logic needed to load and execute the application in a first section of the data structure; and storing at least one data object comprising the project development environment in a second section of the data structure;

segmenting the data objects into a name-value based portion and an associated stream-based portion; and segmenting the name-value based portion into an indicator segment identifying a boundary between the first section and the second section.

18. A program storage device, readable by computer, having a processor and a memory, tangibly embodying one or more programs of instructions executable by the computer to perform the method steps of storing and restoring data representing a software project in a comprehensive data structure readable by the computer, the software project operable with a plurality of data objects and comprising a project application, a project development environment and a plurality of data objects, the method comprising the steps of:

storing at least one data object comprising the executable programming logic needed to load and execute the application in a first section of the data structure; and storing at least one data object comprising the project development environment in a second section of the data structure;

segmenting the data objects into a name-value based portion and an associated stream-based portion; and segmenting the name-value based portion into an object type segment and a version information segment.

* * * * *